Figure 1:
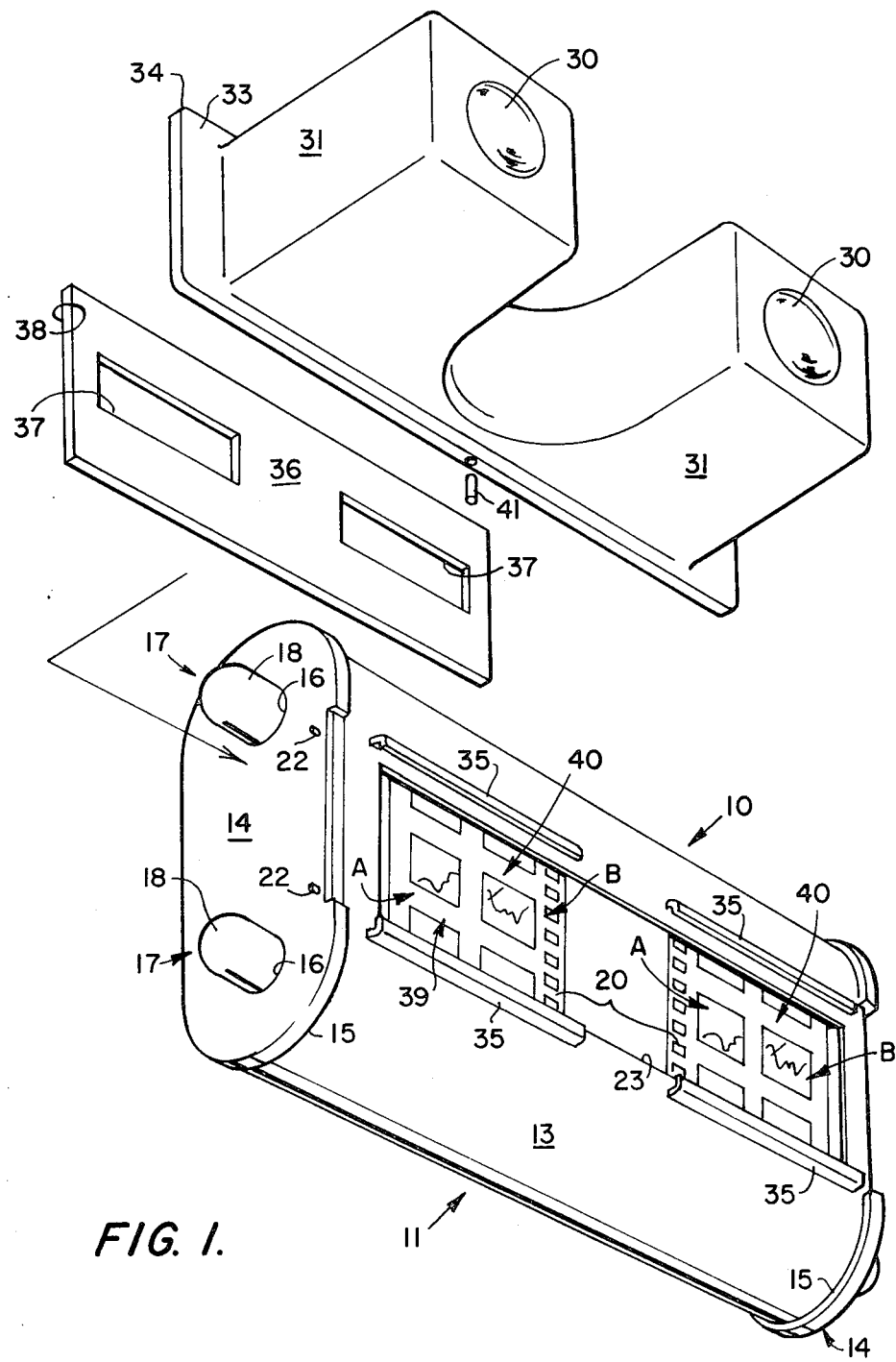

United States Patent [19]
Brassington

[11] 3,722,983
[45] Mar. 27, 1973

[54] TWIN TRACK CARTRIDGE STEREOSCOPIC VIEWER

[75] Inventor: Samuel M. Brassington, Concord, Calif.

[73] Assignee: Material Flow Inc., Chicago, Ill.

[22] Filed: Nov. 24, 1969

[21] Appl. No.: 879,166

[52] U.S. Cl. ................................................. 350/135
[51] Int. Cl. ............................................ G02b 27/22
[58] Field of Search .............. 350/135, 133, 134, 140; 355/75

[56] References Cited

UNITED STATES PATENTS

| 1,957,043 | 4/1934 | Harlow | 350/134 X |
| 2,674,152 | 4/1954 | Wilkinson | 350/134 X |
| 1,510,470 | 10/1924 | Dunlany et al. | 350/135 |
| 2,257,444 | 9/1941 | Abadjieff | 355/75 |
| 3,288,027 | 11/1966 | Ruzicka | 355/75 |

FOREIGN PATENTS OR APPLICATIONS

| 188,930 | 4/1956 | Austria | 350/140 |
| 339,231 | 3/1907 | France | 350/134 |
| 617,514 | 2/1927 | France | 350/134 |
| 1,017,734 | 12/1952 | France | 350/135 |

*Primary Examiner*—David Schonberg
*Assistant Examiner*—Paul A. Sacher
*Attorney*—Fryer, Tjensvold, Feix, Phillips & Lempio

[57] ABSTRACT

A stereoscopic viewer employs a film strip having two tracks of matched stereoscopic prints or frames which are wound in a magazine for reel-to-reel transport between spaced-apart reels and a binocular eyepiece slidably mounted on the magazine whereby the magazine can be shifted to view the frames in one track as the film is advanced in one direction by the reels and to view the frames of the other track as the film is advanced in the opposite direction or can be intermittently shifted to the adjacent track for correlating related information on the two tracks.

1 Claim, 3 Drawing Figures

INVENTOR.
SAMUEL M. BRASSINGTON

BY Fryer, Tjensvold,
Feix, Phillips & Tempio
ATTORNEYS

PATENTED MAR 27 1973 3,722,983

SHEET 2 OF 2

INVENTOR.
SAMUEL M. BRASSINGTON

ATTORNEYS

TWIN TRACK CARTRIDGE STEREOSCOPIC VIEWER

BACKGROUND OF THE INVENTION

Stereoscopic viewers, stereoscopes, have been employed for many years and employ matched stereoscopic photographs of slightly off-set views of the same scene to create the sensation of depth (a three dimensional effect) when these photographs are viewed side by side in a stereoscope.

Some of the first stereoscopes employed cards having the matched stereoscopic photographs printed on individual cards which were manually changed to change the scene, each card having a separate scene. More recently the cards have been replaced by discs having a plurality of peripheral windows in which the matched stereoscopic photographs are mounted diametrically in the windows. The disc can be turned an interval to bring a new scene into viewing field. Since the separation of the matched stereoscopic photograph is the inner ocular distance to keep the optics simple, only a limited number of scenes can be placed on these discs.

As a result, both the individual cards and the disc arrangements in stereoscopes require the user to constantly change cards or discs. The constant handling of the cards and discs often damages them and where color transparencies are employed as the stereoscopic photographs, this handling can cause serious deterioration of transparencies. In addition, the cards and discs are quite costly to manufacture along with the inconveniences experienced when they are used in a stereoscope.

An object in the present invention is to provide a stereoscopic viewer wherein manual handling of the matched stereoscopic photographs is not required and in which special mountings or supports therefor can be eliminated.

Also, it is an object of the invention to provide an economical stereoscopic viewer which can contain numerous scenes in a replaceable cartridge magazine.

It is also an object of the present invention to provide a twin track reel-to-reel stereoscopic viewer having increased convenience and increased capacity.

A number of other objects and advantages will be apparent from the description of the new stereoscopic viewer and the attached drawings.

SUMMARY OF THE INVENTION

A twin track stereoscopic viewer includes a cartridge magazine having a pair of spaced-apart reels mounted therein for reel-to-reel transport of a film load with twin tracks of stereoscopic photographs which magazine also has a viewing aperture between the reels for viewing the twin tracks, and a binocular eyepiece having framing windows slidably mounted on the magazine over the viewing aperture whereby the eyepiece can be shifted so its framing windows register with one track or the ouher track during reel-to-reel transport of film load by manually turning the reels.

When the film load is composed of color transparencies, a light admitting aperture can be formed in the magazine behind the viewing aperture and covered by a translucent light diffuser to provide background light.

Internal guides are employed to insure proper film transport and the sliding movement of the binocular eyepiece can be restricted with stops to achieve proper registry of the framing windows with the twin tracks of stereoscopic photographs when it is shifted.

BRIEF DESCRIPTION OF AN EMBODIMENT

A twin track stereoscopic viewer 10 is illustrated in FIG. 1 and includes a magazine 11 and a binocular eyepiece 12 as its principal components.

The magazine 11, which is detachable from the eyepiece 12, includes a hollow case 13 which is oval in cross section and has two flat parallel surfaces. The open ends closed by end plates 14 that cap the ends of the case with associated flanges 15. Mounted in a pair of spaced apertures 16 in each end plate and extending between the end plates are cylindrical reels 17. These reels have their end portions 18 which project through the apertures in the end plate reduced in diameter so that resulting shoulders 19 on the central portion of each reel restrict their reel from any axial drift through abutment against the inside surfaces of the end plates.

The spaced-apart reels 17 which extend inside the case 13 between the end plates 14 are located on opposite sides of the flat surfaces of the case and form the major part of the film load transport system. Film load 20 is wound on reels with its opposite ends anchored in the reels so the film can be transported between the rollers between which it is exposed for viewing, as can be seen in FIG. 1.

As is apparent from the drawings, the projecting circular end portions 18 of either reel 17 can be manually grasped to turn the reel. The drag on the reels is light so these end portions do not need special knobs, grooves or the like in most cases. Knobs (not shown) could be employed if desired, and as indicated subsequently the film load 20 can be transported in either direction which is accomplished by merely grasping the appropriate end portion of one of the reels.

Figure 3:
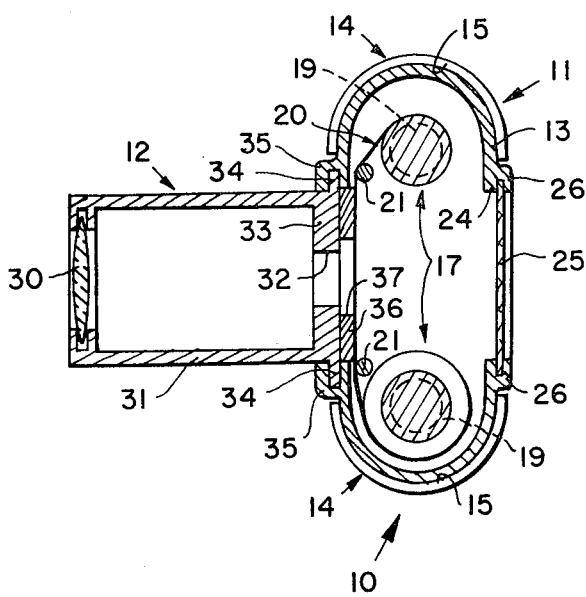

Normally, the film load 20 will be composed of color transparencies and background light is provided through a light admitting aperture 24 in the flat surface of the case 13 opposite the one containing the viewing window 23. A translucent screen 25, such as frosted glass or plastic, is retained over this aperture by employing slotted guides 26 surrounding this aperture that are formed on the outer surface of the case, as can be seen in FIG. 3. A subdued background light is provided through this diffuser screen for viewing the stereoscopic transparencies when the viewer is oriented toward an appropriate light source.

The remaining ocular portion of the twin track stereoscopic viewer is formed by the binocular eyepiece 12. Its bifurcated structure includes magnifying lenses 30 retained in the outboard ends of the two tubular lens mounts 31 that are attached to a flat base plate 33 and project perpendicularly therefrom to form a gap for the bridge of the nose when the viewer positioned in front of the users eyes. The optical axis of each lens is oriented along the longitudinal axis of its associated tubular lens mount and each intersects the center of an associated framing window 32 located in the base plate, a framing window being provided for each tubular lens mount. The spacing between the two parallel optical axes is the conventional inner ocular distance and the size of the framing window is approximately the same dimensions as the stereoscopic photograph frames.

Two edges of the base plate 33 form rails 34 which are received in slotted guides 35 formed on the magazine 11 about the viewing window 23 so the binocular eyepiece 12 can be mounted on the magazine in a manner allowing it to be shifted from side to side.

Before the binocular eyepiece is assembled with the magazine, it is preferable to insert a flat backing member 36 with spaced-apart elongated apertures 37 which are sized so they will not obstruct the framing windows 32 of the eyepiece. This carboard blank forms a support for the film as it is transported between the reels and normally includes a felt-like coating to prevent film damage on its film contacting surface 38. It acts also as a spacer preventing the eyepiece from scratching the film as it is reciprocated in the guide slots 35.

To keep the film load 20 flat against the film contacting surface 38 of the backing member 36, idler rollers 21 are respectively located above and below its elongate apertures 37 being journaled with pins 22 in the end plates 14 of the viewer, as can be seen in FIGS. 1 and 3. Without these rollers, which form a guide system, the "curl" in the film load would tend to cause it to curve out of the viewing plane, i.e., away from the film contacting surface of the backing member.

With the rails 34 of the binocular eyepiece received in guide slots 35, its base plate covers the viewing window 23 of the aperture. Thus, the film load 20 can only be viewed through the framing windows 32 of the base plate. By having two separate stereoscopic tracks located side by side on the film load, the eyepiece can be shifted to view either track independently. Each stereoscopic track A and B (see FIG. 1) consists of two spaced-apart rows 39 and 40 of stereoscopic photographic frames, there being four rows of frames in twin stereoscopic film load.

The binocular eyepiece 12 is shifted to view either track A or track B since the spacing between the frames in each track is the same as the spacing of the framing windows 32 of the eyepiece. Removable stop pins 41 are employed in the edges of the rails 34 so that the eyepiece can be changed to a new magazine and so it can be easily shifted between the two stereoscopic tracks by abutting on the inboard ends of guide slots 35 which are spaced to achieve proper registry of the eyepiece with the tracks.

Figure 2:
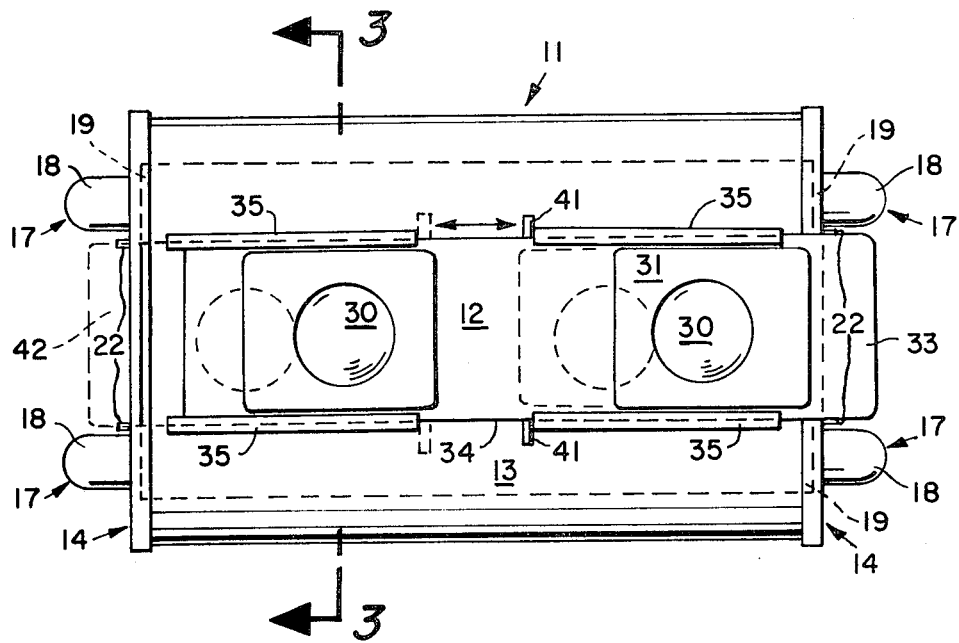

In FIG. 2, broken lines 42 illustrate the position of the eyepiece for viewing track A while the eyepiece is shown in the position for viewing track B.

Using the twin stereoscopic tracks A and B, it is possible to use the viewer for sequential scenes by following the sequence through track A while the film is advanced in one direction and then through track B as the direction of film transport is reversed. Thus, it is not necessary to go through a rewining step in such situations since the end of the B track is the identical point as the start of the A track.

Educational and advertising uses of the twin track stereoscopic viewer are also possible whereby scenes or photographs are placed on one track and a legend is placed on the adjacent frames of the other track. The viewer wishing information about the stereoscopic photograph being observed merely shifts the eyepiece 12 to the adjacent track where the legend is visually displayed.

In the claims:

1. A multi-track stereoscopic viewer comprising: a hollow magazine having a pair of spaced apart reels disposed therein, a multi-track film having parallel rows of pairs of related stereoscopic images thereon disposed between said reels, said reels including extensions projecting from said magazine whereby said reels can be manually turned to advance the film, said magazine having a viewing aperture whereby a portion of said film is exposed when it is transported between said reels, said hollow magazine having spaced apart guide means disposed therewithin normal to the direction of film transport mounted on both sides of said viewing aperture and a backing member including a flat surface fitted in said viewing aperture with spaced apart elongated framing windows therein which cooperate with the guide means to keep said multi-track film wound on said reels flat against said surface for viewing; a binocular eyepiece including lenses to optically increase the size of said images slidably mounted on said magazine closing said viewing aperture, said eyepiece having a pair of spaced apart framing windows whereby said eyepiece can be shifted on said magazine to adjacent stereoscopic images on said film whereby related stereoscopic images register with said framing windows of said eyepiece when such images are selected; a stop means cooperating with the magazine to prevent the release of said eyepiece from said magazine and to index it with the several different stereoscopic images of the film when it is shifted to different images, said stop means being removable to permit the eyepiece to be removed, parallel guides on said magazines slidably receiving rail means on the eyepiece, said parallel guides cooperating with the stop means to retain said rail means within said guides, a source of light within the magazine whereby any pair of images can be selected and viewed through said eyepiece, said source of light including a light admitting aperture in the magazine remote from the viewing aperture which is covered by a translucent diffusing screen to provide a subdued source of light within said magazine from light sources outside the viewer, said backing member being disposed between said multi-track film and the slidably mounted eyepiece to protect the film surface, said backing member being apertured to avoid interference with the framing windows and having a felt-like film contacting surface to prevent film scratching.

* * * * *